W. A. GORDON.
PNEUMATIC CLUTCH.
APPLICATION FILED OCT. 17, 1919.

1,360,394.

Patented Nov. 30, 1920.
2 SHEETS—SHEET 1.

Inventor:
William A. Gordon
by Harry R. Williams
atty

W. A. GORDON.
PNEUMATIC CLUTCH.
APPLICATION FILED OCT. 17, 1919.

1,360,394.

Patented Nov. 30, 1920.
2 SHEETS—SHEET 2.

Inventor:
William A. Gordon
Harry R. Williams
atty.

UNITED STATES PATENT OFFICE.

WILLIAM A. GORDON, OF SHELTON, CONNECTICUT, ASSIGNOR TO BIRMINGHAM IRON FOUNDRY, OF DERBY, CONNECTICUT, A CORPORATION OF CONNECTICUT.

PNEUMATIC CLUTCH.

1,360,394.   Specification of Letters Patent.   Patented Nov. 30, 1920.

Application filed October 17, 1919. Serial No. 331,380.

*To all whom it may concern:*

Be it known that I, WILLIAM A. GORDON, a citizen of the United States, residing at Shelton, in the county of New Haven and State of Connecticut, have invented a new and useful Improvement in Pneumatic Clutches, of which the following is a specification.

This invention relates to the construction of those clutches operated by fluid pressure which, while serviceable for coupling and uncoupling driving and driven members of many classes of machinery, are especially adapted to connect and disconnect the driving and driven shafts of comparatively heavy and relatively slow-running machinery such, for instance, as the rolling machines of rubber, paper and steel mills, pumps, grinders and apparatus of a similar character.

The object of the invention is to provide a very powerful, sure, quick acting, and durable clutch of this nature which is simple and inexpensive to build, easy to adjust and keep in operative condition, and is essentially a safety device in that whenever the air pressure is relieved, as it may be from controls at different localities, in case of accident the driven shaft is instantly released and the machinery driven thereby stopped.

Figure 1:
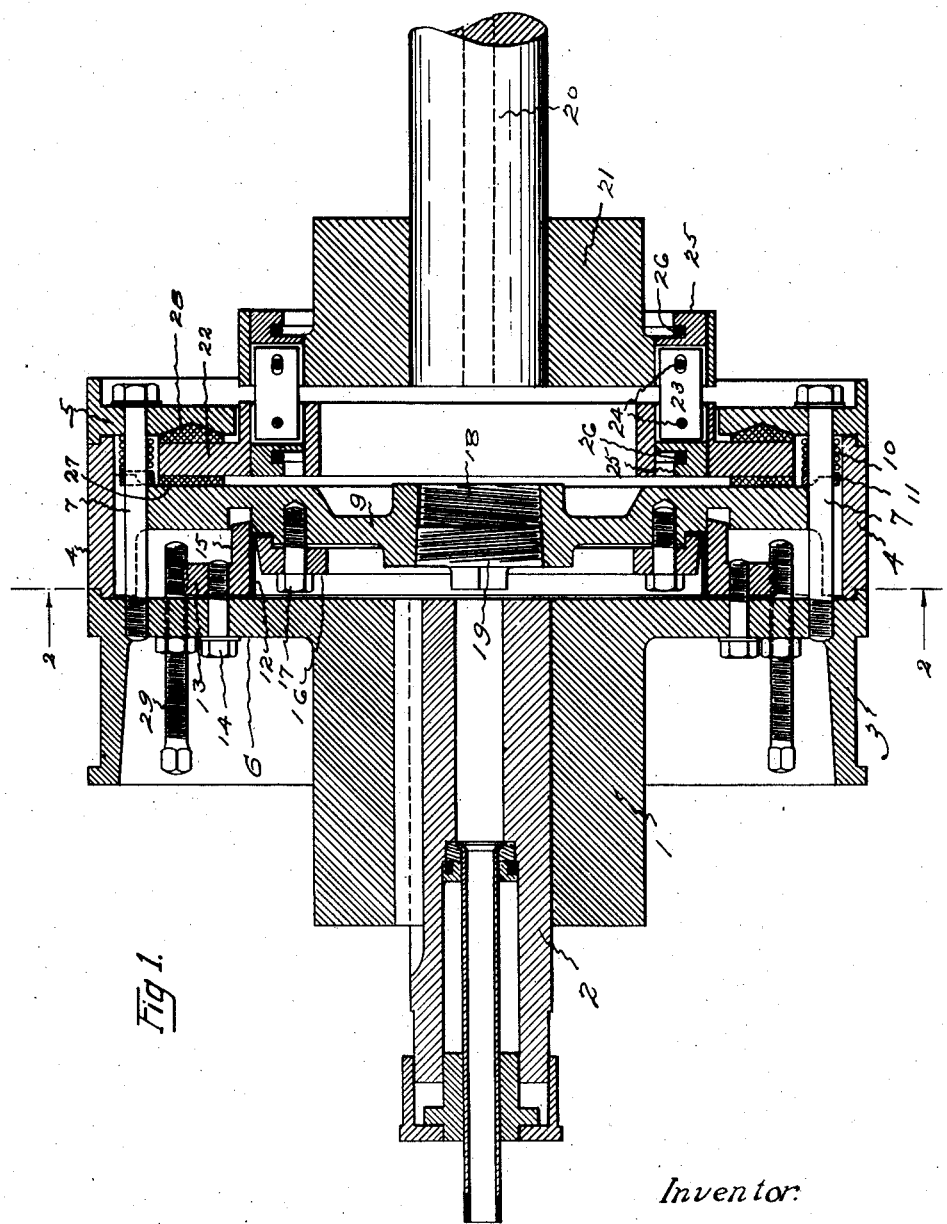
Figure 2:
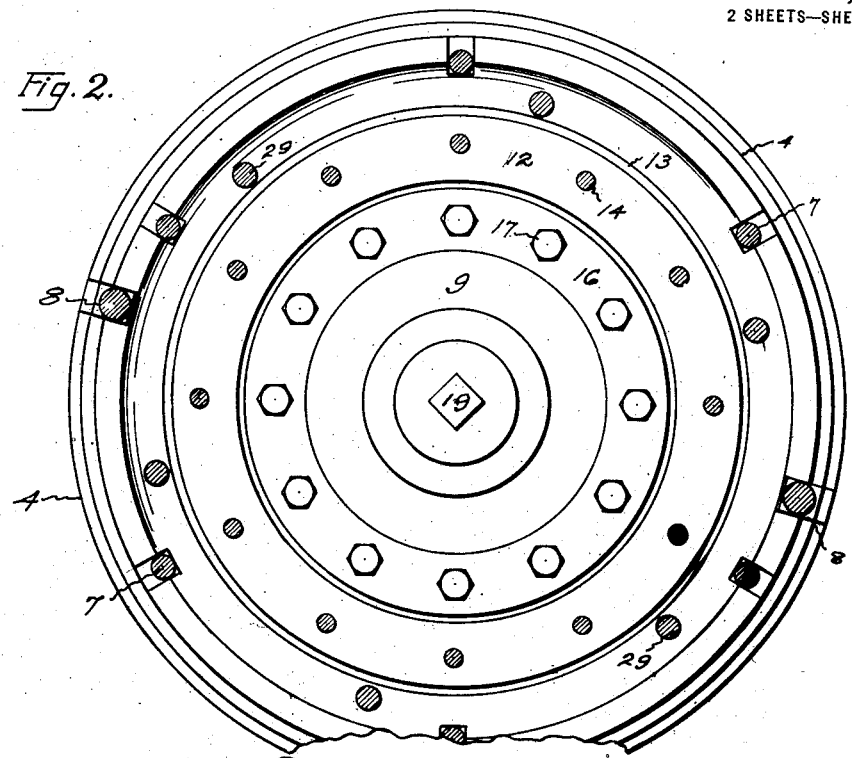
Figure 3:
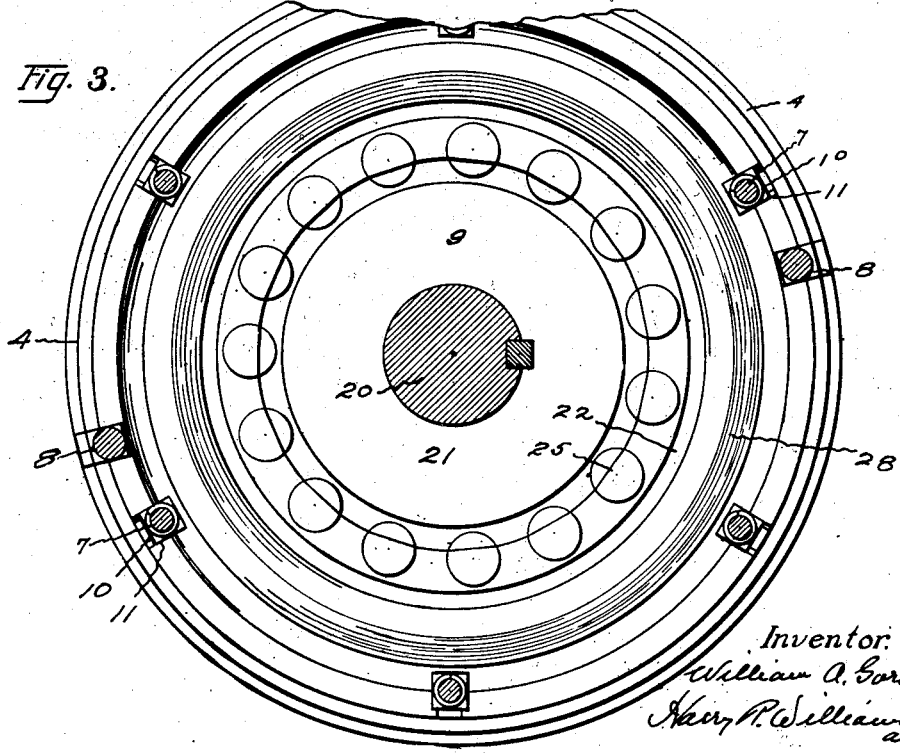

In the accompanying drawings Figure 1 shows a central longitudinal section of a clutch which embodies the invention. Fig. 2 shows a transverse section on the plane indicated by the dotted line 2—2 on Fig. 1, the driven hub and driven shaft being removed. Fig. 3 is a view looking toward the driving end of the clutch with the casing end plate removed.

The driven hub 1 of the clutch is keyed to the hollow driven shaft 2 and may be provided with a gear, pulley, or brake-drum 3. The cylindrical casing is formed of two substantially semi-annular shells 4 which with the end plate 5 are secured to the driven hub web 6 by screw bolts 7, Fig. 1. These parts are locked together so as to rotate as one piece by the bolts and by keys 8, Figs. 2 and 3, which extend from the end plate to the hub web between the ends of the casing sections and also in slots in the periphery of the piston 9 so as to guide the piston in its reciprocating movements. On the screw bolts 7 which pass through the piston are springs 10 that thrust between the inner wall of the end plate and washers 11 loose on the bolts next to the face of the piston for normally pressing the piston from the end plate toward the web of the driven hub and releasing the clutch.

Between the piston and the wall of the driven hub is a packing diaphragm 12. This diaphragm may be made of rubber or similar flexible and elastic material. The outer edge of the diaphragm is fastened to the inner wall of the web of the hub by a clamping ring 13 that is secured by screw bolts 14 which pass through the web. A sleeve 15 extends outward from this ring into a slot in the piston so as to surround and back the diaphragm. The center or the inner edge of the diaphragm if it, as shown, does not extend across the face of the piston, is fastened to the piston by a clamping ring 16 which is secured by screw bolts 17 that turn into the face of the piston. The piston may for manufacturing purposes have a central opening 18, which if provided is closed by a screw plug 19.

Air or other fluid under pressure allowed to enter the casing through the hollow driven shaft being confined by the diaphragm forces the piston outward from the driven hub and sets the clutch. When the fluid pressure is relieved the springs press the piston backward toward the driven hub and release the clutch.

The driving shaft 20 is shown as keyed to the hub 21 of one member of a flexible coupling of common and well known form. The other member of this coupling is provided with a flange 22. The hub and flange members of this type of coupling are connected by flexible metallic strips 23 that are retained by pins 24 which pass through openings in the flexible strips and housings 25 that are held in the coupling members by spring rings 26. Fastened on one face of the flange member of the coupling is a flat clutch ring 27 and fastened on the other face of the flange is a clutch ring 28 which is beveled and fitted to a beveled recess in the face of the end plate. These clutch rings are desirably made of the material well known as raybestos and the beveled ring tends to accurately centralize the flange member of the coupling when the piston moves forward to set the clutch, without the necessity of providing for lubrication.

When fluid pressure is allowed to enter the casing the piston is forced outward and the flange member of the coupling and the clutch rings which are fastened to it, are compressed between the piston and the end plate of the casing so as to strongly couple the parts together. In case the fluid pressure should at any time give out or be unavailable and it is desired to set up the clutch the piston may be forced forward so as to bind the parts by means of the screws 29.

The invention claimed is:—

1. A clutch comprising a hollow driven shaft, a hub secured to the end of the driven shaft, a casing secured to said hub, a piston movable in the casing toward and from the hub, a diaphragm of elastic material with one edge secured to the hub and the other edge secured to the piston, means between the hub and piston surrounding and supporting the diaphragm, a driving shaft, and a coupling attached to the end of the driving shaft, a part of said coupling being adapted to be compressed between the piston and the end wall of the casing when fluid pressure is admitted through the hollow shaft to the space between the hub and piston.

2. A clutch comprising a hollow driven shaft, a hub secured to the end of the driven shaft, a casing secured to said hub, a piston movable in the casing toward and from the hub, a flexible diaphragm secured to the hub and to the piston, a driving shaft, and a flexible coupling comprising an outer member attached to the end of the driving shaft and an inner member with an outwardly extending flange yieldingly connected with the outer member, said flange being loosely retained and adapted to be compressed between the piston and the end wall of the casing when fluid pressure is admitted through the hollow shaft to the space between the hub and piston.

3. A clutch comprising a hollow driven shaft, a hub secured to the end of the driven shaft, a cylindrical shell with removable end wall secured to said hub, a piston movable in the casing toward and from the hub, a flexible diaphragm with one edge secured to the hub and the other edge secured to the piston, a driving shaft, and a flexible coupling comprising an outer member attached to the end of the driving shaft and an inner member with an outwardly extending flange yieldingly connected with the outer member, said flange being loosely retained and adapted to be compressed between the piston and said end wall when fluid pressure is admitted through the hollow shaft to the space between the hub and piston.

4. A clutch comprising a hollow driven shaft, a hub secured to the end of the driven shaft, a casing secured to said hub, a piston movable in the casing toward and from the hub, a flexible diaphragm with one edge secured to the hub and the other edge secured to the piston, a driving shaft, a flexible coupling comprising an outer member attached to the end of the driving shaft and an inner member with an outwardly extending flange yieldingly connected with the outer member and friction rings secured to opposite sides of said flange, said flange and rings being loosely retained and adapted to be compressed between the piston and the end wall of the casing when fluid pressure is admitted through the hollow shaft to the space between the hub and piston.

5. A clutch comprising a driven shaft, a hub secured to the end of the driven shaft, a casing secured to said hub, a piston movable in the casing toward and from the hub, a flexible diaphragm with one edge secured to the hub and the other edge secured to the piston, means for admitting fluid pressure between the piston and hub inside of said diaphragm, a driving shaft, and a disk loosely connected to the end of the driving shaft, said disk being retained so that it may adjust itself transversely of the driving shaft and be compressed between the piston and the end wall of the casing when fluid pressure is admitted to the space between the hub and piston.

6. A clutch comprising a hollow driven shaft, a hub secured to the end of the driven shaft, a casing secured to said hub, a piston movable in the casing toward and from the hub, a flexible diaphragm, a clamping ring securing one edge of the diaphragm to the hub, a clamping ring securing the other edge of the diaphragm to the piston, a driving shaft, and a flexible coupling comprising an outer member attached to the end of the driving shaft and an inner member with an outwardly extending flange yieldingly connected with the outer member, said flange being loosely retained and adapted to be compressed between the piston and the end wall of the casing when fluid pressure is admitted through the hollow shaft to the space between the hub and piston.

7. A clutch comprising a hollow driven shaft, a hub secured to the end of the driven shaft, a casing secured to said hub, a piston movable in the casing toward and from the hub, a flexible diaphragm, a clamping ring securing one edge of the diaphragm to the hub, a sleeve projecting from said ring and surrounding said diaphragm, a clamping ring securing the other edge of the diaphragm to the piston, a driving shaft, a flexible coupling attached to the end of the driving shaft, and an outwardly extending flange on the inner member of said coupling, said flange being adapted to be compressed between the piston and the end wall of the casing when fluid pressure is admitted through the hollow shaft to the space between the hub and piston.

8. A clutch comprising a hollow driven shaft, a hub secured to the end of the driven shaft, a casing, bolts securing the casing to said hub, a piston movable in the casing and guided by said bolts toward and from the hub, a flexible diaphragm with one edge secured to the hub and the other edge secured to the piston, a driving shaft, a coupling attached to the end of the driving shaft, an outwardly extending flange loosely connected with said coupling, and friction rings secured to opposite sides of said flange, said flange and rings being adapted to be compressed between the piston and the end wall of the casing when fluid pressure is admitted through the hollow shaft to the space between the hub and piston.

9. A clutch comprising a driven shaft, a hub secured to the end of the driven shaft, a casing secured to said hub, a piston movable in the casing toward and from the hub, means for admitting fluid pressure between the piston and hub, a driving shaft, a coupling attached to the end of the driving shaft, and an outwardly extending flange loosely connected with said coupling, said flange being adapted to be compressed between the piston and the end wall of the casing when fluid pressure is admitted to the space between the hub and piston.

10. A clutch comprising a hollow driven shaft, a hub secured to the end of the driven shaft, a casing secured to said hub, a piston movable in the casing toward and from the hub, a flexible diaphragm secured to the hub and to the piston, a driving shaft, a flexible coupling attached to the end of the driving shaft, an outwardly extending flange on the inner member of said coupling, said flange being adapted to be compressed between the piston and the end wall of the casing when fluid pressure is admitted through the hollow shaft to the space between the hub and piston, and means carried by the hub for forcing the piston tightly against said flange when fluid pressure is unavailable.

11. A clutch comprising a driven shaft, a casing secured to the driven shaft, a piston movable in the casing toward and from the driven shaft, a flexible diaphragm with one edge secured to the casing and the other edge secured to the piston, means for admitting fluid pressure between the piston and casing inside of said diaphragm, a driving shaft, a flexible coupling comprising an outer member attached to the end of the driving shaft and an inner member loosely connected with the outer member, said inner member being adapted to be compressed between the piston and end wall of the casing when fluid pressure is admitted to the space between the casing and piston, and springs for forcing the piston oppositely to the fluid pressure.

12. A clutch comprising a driven shaft, a hub secured to the end of the driven shaft, a casing secured to the hub, a piston movable in the casing toward and from the hub, a diaphragm of elastic material, a ring detachably connecting the outer edge of the diaphragm to the hub, a ring detachably connecting the inner edge of the diaphragm to the piston, means surrounding and protecting said diaphragm, means for admitting fluid pressure between the piston and hub inside of the diaphragm, a driving shaft, and a coupling attached to the end of the driving shaft, a part of said coupling being adapted to be compressed between the piston and end wall of the casing when fluid pressure is admitted to the space between the hub and piston.

13. A clutch comprising a driven shaft, a hub secured to the end of the driven shaft, a casing secured to said hub, a piston movable in the casing toward and from the hub, means for admitting fluid pressure between the piston and hub, a driving shaft, a flexible coupling attached to the driving shaft, an outwardly extending flange on the inner member of said coupling, and friction and centralizing rings secured to the faces of said flange, said flange and rings being adapted to be compressed between the piston and end wall of the casing when fluid pressure is admitted to the space between the hub and piston.

14. A clutch comprising a driven shaft, a hub secured to the end of the driven shaft, a casing secured to said hub, a piston movable in the casing toward and from the hub, means for admitting fluid pressure between the piston and hub, a driving shaft, a flexible coupling attached to the driving shaft, an outwardly extending flange on the inner member of said coupling, and a beveled friction ring secured to the outer face of said flange and adapted to fit a beveled recess in the inner face of the end wall of the casing and to be compressed therein when fluid pressure is admitted to the space between the hub and piston.

WILLIAM A. GORDON.